April 25, 1967  B. T. WALL  3,315,770
HYDRAULIC BRAKE
Filed March 1, 1965  2 Sheets-Sheet 1
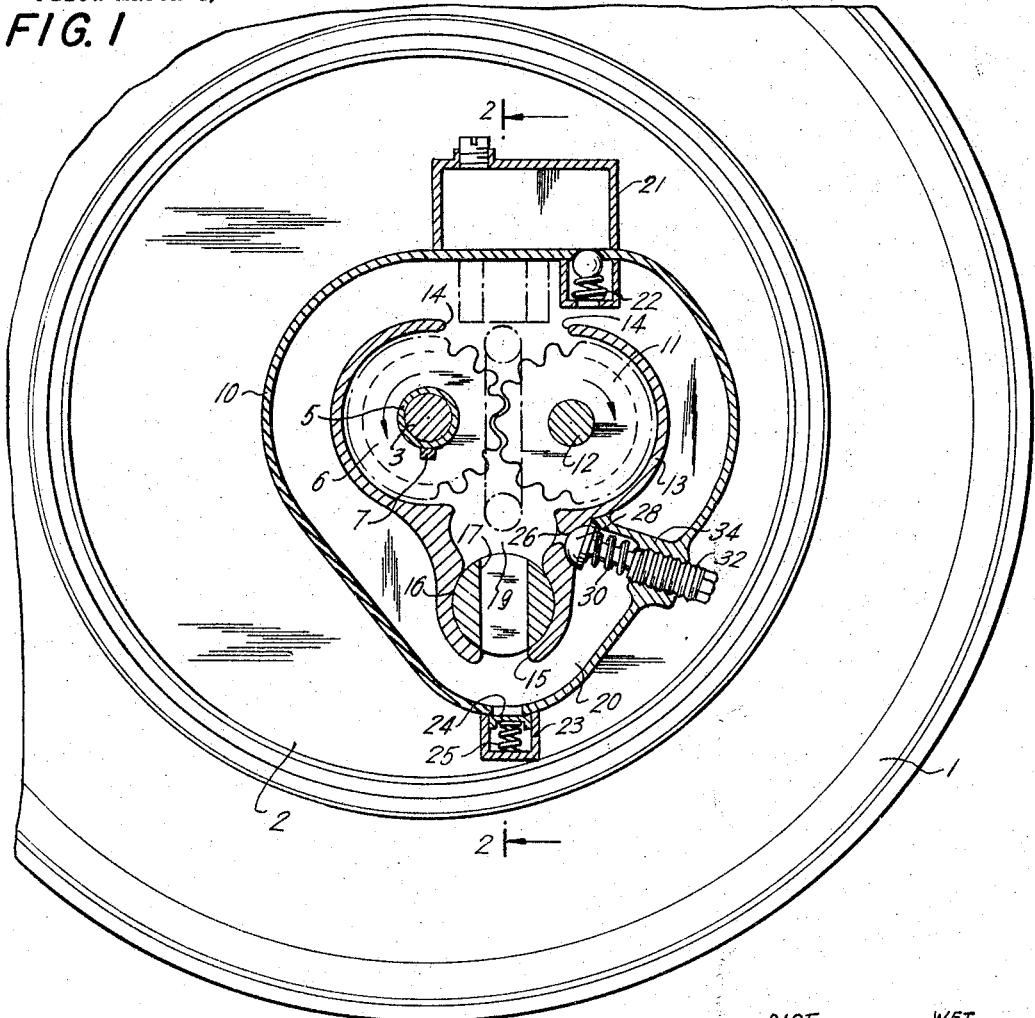
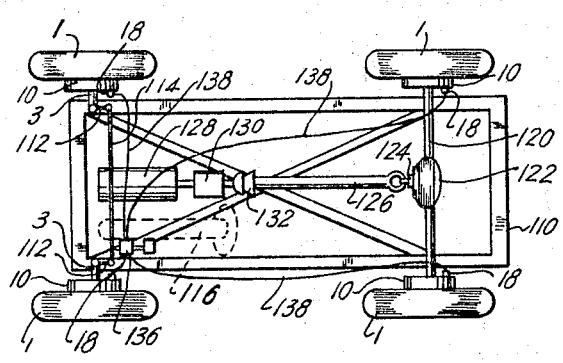
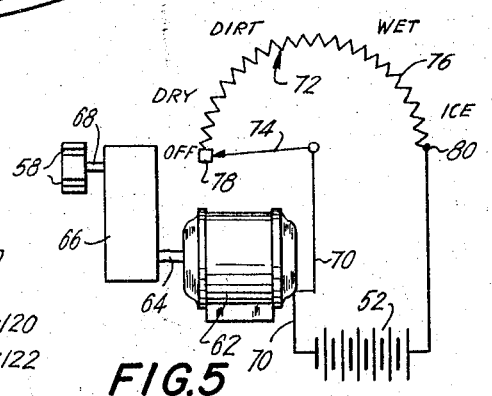
INVENTOR.
BYRON T. WALL
BY George H. Mortimer
ATTORNEY April 25, 1967     B. T. WALL     3,315,770
HYDRAULIC BRAKE Filed March 1, 1965     2 Sheets-Sheet 2

INVENTOR.
BYRON T. WALL
BY
George H. Mortimer
ATTORNEY

United States Patent Office 3,315,770
Patented Apr. 25, 1967

3,315,770
HYDRAULIC BRAKE
Byron T. Wall, 143—20 Franklin Ave.,
Flushing, N.Y. 11355
Filed Mar. 1, 1965, Ser. No. 435,795
15 Claims. (Cl. 188—90)

The present invention relates to hydraulic brakes and more particularly to brakes utilizing a liquid, which has practically no compressibility, in a closed path provided with a braking valve capable of inhibiting or stopping the flow and thereby exert a braking action on a positive delivery pump which is operatively connected with the part to be slowed or stopped.

The structure and function of the hydraulic brakes of the invention will become apparent from the following description taken in conjunction with the drawing in which:

FIG. 1 is an elevational view of the brake applied to an automobile wheel along the line 1—1 of FIG. 2 to show the internal structure of the brake;

FIG. 5 is a wiring diagram for the commutator switch in the solenoid circuit; and FIG. 6 is a schematic representation of the chassis of an automobile with the invention in combination therewith.

Figure 2:
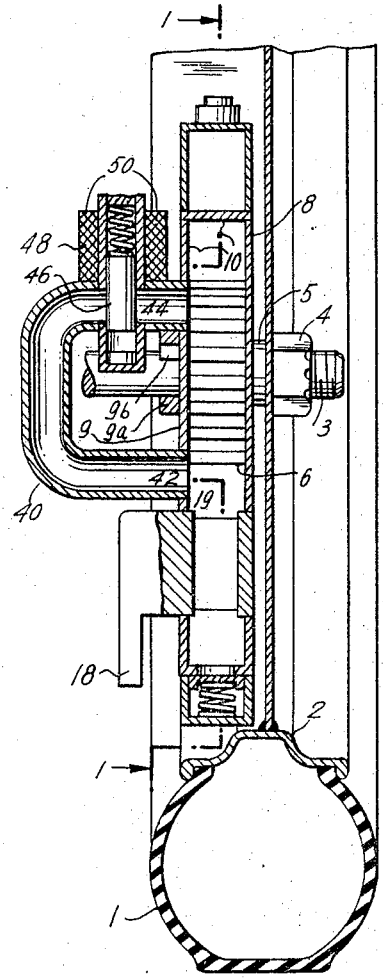
FIG. 2 is a vertical sectional view taken along the line 2—2 of FIG. 1.
Figure 3:
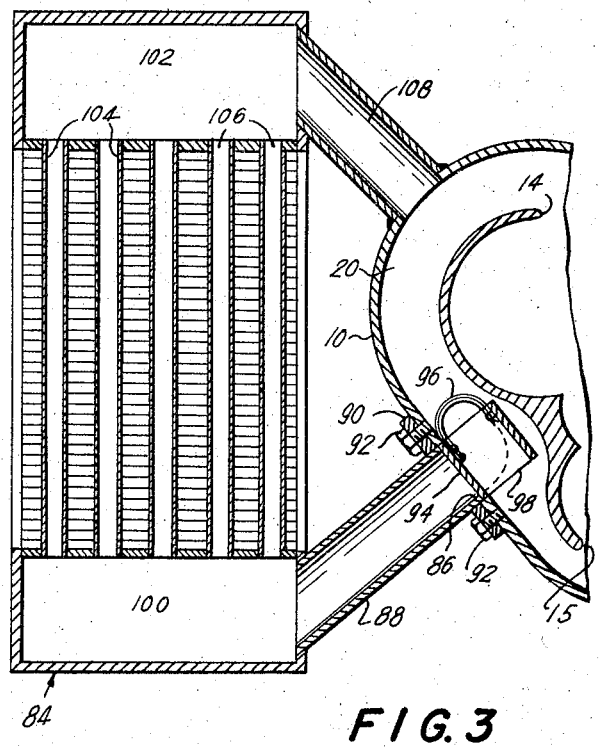
FIG. 3 is a fragmentary vertical sectional view showing a heat exchanger connected with a brake housing.

In the drawing number 1 represents the tire of a motor vehicle mounted on a wheel 2. The wheel illustrated is the right front wheel seen from the inside looking out. The wheel is rotatably mounted on the front axle 3 by means of a castellated nut 4 in the usual way. Details of the mounting, such as bearings, etc., are not shown because they are not part of the invention. Secured to the wheel, e.g., by welding or otherwise, is a tube 5 surrounding the axle on which is mounted a gear 6. A key 7 is provided on the tube 5 to assure non-rotatable connection between the tube 5 and the gear 6.

Interposed between the wheel and the gear 6 is a wall 8 of a brake housing which includes a similarly shaped wall 9 at the other side of the gear and a connecting wall 10. The brake housing is fixed to some part of the automobile so as to be non-rotatable with the wheel, e.g., by a collar 9a welded to wall 9 and keyed to shaft 3 by a key 9b. Good liquid seals (not shown) are provided where the tube 5 passes through the brake housing to prevent leakage of liquid, which fills the housing, during rotation. Any suitable liquid seal may be used.

A second gear 11 in mesh with gear 6 is shown in FIG. 1. It is freely mounted for rotation on a stub shaft 12 secured to the walls 8 and 9. The driving gear 6 and the driven gear 11 with a pump casing 13 form a positive displacement pump with the inlet 14 at the top and the outlet 15 at the bottom. In the outlet a cock 16 is rotatably mounted so that a bore 17 therein can be turned by a lever or crank arm 18 to a position such as illustrated in FIGS. 1 and 2 where liquid can flow freely through the cock valve or to a position at right angles thereto where no liquid can flow from the pump housing or to any intermediate position. The cock valve is spaced from the gears a sufficient distance to provide a pressure chamber or passage 19.

It will be apparent that when the pump and brake housings are filled with liquid and the wheel is rotating with the cock valve in the position shown in FIGS. 1 and 2 the gear pump will move in the direction of the arrows to bring in liquid through the inlet 14, force it from the gears where they mesh and drive it with positive displacement through pressure chamber or passage 19, cock 16, outlet 15, around a passageway 20 between the pump and brake housings and return it to inlet 14.

In order to keep the brake and pump housings filled with liquid a tank 21 is provided above the brake housing which communicates with the interior thereof through a check valve 22 which permits flow of liquid from the tank into the housing but not vice versa. Also communicating with the interior of the brake housing is an expansion chamber 23 provided with a piston 24 biased toward the interior of the housing by a spring 25 to take care of changes of volume of the liquid due to changes in its temperature.

The parts thus far described constitute a fully operative brake. Thus to slow down or stop the rotation of the wheel 2 it is only necessary to turn the cock 16 by means of the crank 18 until the passage 17 is partially or fully blocked by the adjacent walls of the outlet passage 15. The heat generated in the liquid by the conversion of the momentum of the moving parts into heat energy can be dissipated in any way, e.g., by providing vanes (not shown) on the housing walls 8, 9 and/or 10, by conducting the liquid to a heat exchanger or the like, as more fully described hereafter It will be appreciated that if the cock 16 is suddenly turned completely off the wheel 2 will be suddenly stopped and this might cause a skid of the motor vehicle. It is therefore preferable to provide means to limit selectively the amount of braking effort that can be applied. Such a means is illustrated in FIG. 1 comprising an outlet passage 26 from the passage 19 which is normally closed by a valve 28 under constant bias to closed position by a spring 30 which can be adjusted as to tension by a screw 32 mounted in a suitable housing 34 provided with an outlet opening 36 into passageway 20. This arrangement prevents too drastic an application of braking force to the wheel 2 by cock 16.

An additional or alternative means to modify the braking effort resulting from closing the cock 16 is a by-pass passageway 40 having an inlet 42 communicating with the pressure chamber or passage 19 in the pump housing or casing 13 and an outlet 44 into the pump inlet 14 so that the liquid can flow through passageway 40 from the high pressure side of the positive displacement pump, i.e., the pressure chamber 19, to the low pressure side, i.e., the inlet 14. Controlling the flow is a valve 46 which may take any desired form such as the solenoid valve illustrated in which 46 is the plunger of the solenoid biased by gravity or a spring 47 to closed position as shown in FIG. 2 and subject to movement in response to current through a coil 48 connected by leads 50 to a source of electric current such as battery 52. In this circuit is a switch 54 which may be manually or automatically operated to cope with any road conditions that may be encountered in driving motor vehicles. For example if the automobile is driven on a dirt road the brake should never be applied hard enough to lock the wheels because the efficiency of braking is seriously reduced when the wheels skid and in any prolonged skid the car goes out of control of the driver. For such roads the maximum braking effort should be such that the wheels continue to roll and present a constantly changing tread pattern just short of a skid or locked wheel, or at most relieve the braking force immediately if a wheel does begin to skid.

For wet hard surfaced roads the squeegee action of a locked tire is effective for only a limited period without danger of skidding. An intermittent application of brakes provides a most effective control in such as condition. Ice or icing conditions on a road presents a different condition wherein the surface has a very low holding power and a skid of even short duration can start a most serious kind of lack of control. Application of brakes, even by a skilled operator, can bring about a hazardous reaction and a rapid intermittent application, which is the most effective braking action for slippery roads, can not be easily achieved by foot control.

Figure 4:
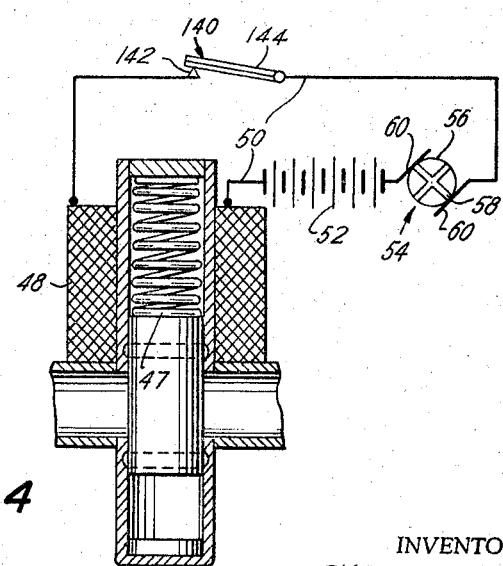
FIG. 4 is a wiring diagram of the circuit for a solenoid control valve.

A highly desirable kind of switch in the circuit to the coil 48 is one such that, as illustrated in FIGS. 4 and 5, it operates the valve intermittently at intervals of controlled duration. In this switch a commutator 56 having a plurality of connected contacts 58 is mounted for rotation between two brushes 60 connected respectively to the battery 52 and one of the leads 50. The other lead 50 is connected to the other pole of the battery 52.

The commutator 56 is preferably driven at a controlled speed to adapt the brake for proper operation under existing road conditions. Such a speed control is shown in FIG. 5 to comprise a motor 62 having a shaft 64 operatively connected with a gear box 66 to reduce the speed of rotation so that the final driven shaft 68 rotates within a desired range of speed for the brake control. The shaft 68 is operatively connected with the commutator and drives it at a rate controlled within these limits by the operator. In series with the motor leads 70 are the battery 52 and a rheostat or potentiometer 72 which has a movable arm 74 to make contact at any desired point with the resistance unit 76 or an off-position insulator 78. By moving the arm to the end of the unit 76 adjacent to the off-position the minimum current flows which drives the motor slowly and pulses the brake application at relatively infrequent intervals, say every 10 seconds. This is satisfactory for dry, hard surfaced road conditions. If one is driving on a dirt road more frequent pulses may be needed and this is done merely by moving arm 74 closer to terminal 80 and thus speed up the motor. On wet and icy roads even faster pulsations may be required to prevent skids and this may be obtained by moving arm 74 along the unit 76 closer and closer to contact 80. Thus the operator can preset arm 74 to the road conditions and then apply the brake, e.g., by depressing the foot brake which is operatively connected to the crank 18, without regard to how suddenly or severely he does it and the switch 54 then takes over and automatically applies the braking force just right for the road conditions. The switch thus preferably has a plurality of settings that the operator can manually select for the type of road conditions he is driving over, such as illustrated in FIG. 5.

As described above the by-pass passageway 40 and means for pulsing the flow of liquid therethrough may be provided in addition to the outlet passage 26 and spring biased valve 28 or as an alternative means for modifying the braking effort resulting from closing cock 16. Preferably both are provided because they supplement each other. Thus spring biased valve 28 is adjusted by varying the tension on spring 30 to open when the pressure has been built up by closing cock 16 to a preset level but the adjustment of the tension on spring 30 is not under control of the operator of the vehicle during driving. On the other hand the means for pulsing the flow of liquid through by-pass passageway 40 is under his control during driving and is independent of the pressure in the pressure chamber, i.e., his use thereof is independent of the pressure that is built up by closing cock 16 since he can utilize the pulsing means at any time regardless of the pressure, although the pressure can never exceed the preset level for spring biased valve 28. Thus both means can operate simultaneously if pressure is suddenly built up to the preset level by closing cock 16 but in general the pulsing control means will be used by the operator when the pressure is lower than the preset level for opening the spring biased valve which serves then only as an emergency means for pressure relief.

One outstanding advantage of the hydraulic brake of the present invention is that there are no rubbing surfaces so that the life of the brake is many times longer than mechanical brakes whether applied hydraulically or by mechanical linkages. There is no tendency for the brakes to fade, as there is with friction brakes. Adjustments can be made to each wheel very accurately and can be set to be most effective for the particular weight distribution of the automobile.

Automobiles, for instance, which have the motors mounted in the rear should have the rear wheel brakes adjusted to apply greater braking force than the front wheels whereas those having the motor in the front should have the front wheels apply the greater braking force compared to the rear wheels. Such adjustments are easily accomplished in this brake system by properly setting screws 32 and/or by any suitable adjustable connection from the brake pedal to the cranks or arms 18.

The liquids used in the brake of the invention should be a low viscosity type that changes very little with temperature from sub-zero temperatures encountered in northern countries in the winter to the highest temperature reached in torrid zones during prolonged braking. Such liquids are known to those skilled in the art and need not be further identified.

The packings used in the brake to effect a liquid-tight seal between fixed and moving surfaces can be of the type used in water and oil pumps which operate for long periods of time without attention and at higher rotational speeds then the wheels of the automobile. Those skilled in the art are well aware of the structure of these packings which are therefore not shown in detail herein because they are not part of the invention.

For prolonged braking of heavy vehicles the amount of heat generated may be more than vanes on the brake housing can effectively dissipate. In such cases it is preferred to take all or part of the liquid from the outlet 15, pass it through a heat exchanger 84 and return it to the inlet opening 14 of the pump in cooled condition.

For this purpose casing 10 is provided with an outlet 86 leading to a pipe 88 removably connected to the housing by a flange 90 and bolts 92. In outlet 86 is a thermostatically controlled hinged plate 94 to which one end of a bimetallic spring 96 is pivoted adjacent to the hinge of plate 94. The other end is secured to a bracket 98 on the thermostat. As the liquid in passage 20 heats up, spring 96 takes a narrower arc and opens plate 94 more or less depending on the temperature to allow some or practically all of the oil to flow through the heat exchanger.

The heat exchanger 84 comprises a lower plenum 100 connected with pipe 88, an upper plenum 102, a plurality of tubes 104 of good heat conducting metal provided with external fins 106, e.g., much like the radiator of an automobile of which it may be a part. The upper plenum connects with passage 20 adjacent to inlet 14 by way of pipe 108. The flow of the liquid through the heat exchanger can easily be controlled by the thermostat.

While the brake has been described and illustrated in connection with an automobile it will be apparent that it is of general utility for any device which has a rotating part that should be braked. Even reciprocating motion can be braked by the expedient of using a rack and pinion to convert the reciprocating motion to rotary motion and connecting the rotating part to the drive shaft 3 of the gear pump of the brake. The brake works equally well for forward and rearward motion of the vehicle so far as the action of cock 16 and by-pass 40 are concerned, but valve 28 works only for forward motion. On reverse motion 15 and 19 constitute the inlet to the pump, 14 the outlet, passage 20 the pressure chamber, 44 the inlet to the by-pass 40 from the pressure chamber and 42 the outlet from the by-pass 40 to the inlet 19 of the pump. It should be noted that the by-pass 40 and associated parts which are shown in dashed lines in FIG. 1 are not behind the brake housing but in front of the same and are shown in these dashed lines only to show their relation to the other parts.

Referring now to FIG. 6, the frame of a motor vehicle, e.g., a passenger automobile, is shown by numeral 110 with four wheels 1 mounted thereon. The front axles 3 are mounted on the frame as part of pivoted bell cranks 112 which are connected by links 114 to the steering mechanism 116 in conventional or any suitable manner. The rear wheels are mounted on the rear axles in a rear end assembly 120 comprising a differential gear 122 and a universal joint 124 connected to the drive shaft 126. The drive shaft is connected in turn to the motor 128 through a transmission 130 and a universal joint 132. A foot brake 134 is connected to any suitable central control system 136 which is connected by any suitable means 138 to the crank arms 18 of the four brakes. The means 138 may be mechanical, electrical or hydraulic and connections such as are now known or may be hereafter developed for operating brakes from a foot pedal will be suitable for the present invention. The specific elements in the control means 138 utilized herewith are not part of the invention per se but only in combination with the hydraulic brakes herein described and illustrated.

A safety feature can be provided in the circuit for the coil 48, if desired. It is possible that the switch 56 might stop in closed position, thus leaving the by-pass 40 open with nothing to stop the rotation of the wheel. To prevent this means may be provided to break the circuit or to compel the switch to stop in open position. In FIG. 4 a bimetallic switch 140 is connected in series with the commutator switch. It comprises a contact 142 connected with lead 50 and normally in contact with one end of a bimetallic strip 144 which is connected at its other end with line 50. This bimetallic strip has the characteristic of remaining closed in normal operation of this circuit but if switch 54 stops in closed position, switch 140 will shortly open by reason of the heating effect of the current flowing through it for a longer than normal period.

It may also be desirable to put another switch in the circuit of FIG. 5 which is operated from normally open position to closed position each time the brake pedal is depressed. In this case contact 78 could be eliminated and the arm 74 left always in contact with some portion of the unit 72.

While the invention has been described and illustrated in certain preferred embodiments it will be understood that many modifications and adaptations can be made without departing from the spirit and scope of the invention as defined in the following claims.

Having thus described and illustrated the invention, what is claimed is:

1. A brake for a movable part comprising a positive displacement pump adapted to be operatively connected to said movable part, said pump having an inlet, a pressure chamber and an outlet, a valve in said outlet movable from an open to a closed position, means for moving said valve, a passageway forming a closed path from said outlet to said inlet, a by-pass connecting said pressure chamber to said inlet, said pump, by-pass and passageway being adapted to be filled with liquid whereby said pump, when driven by said movable part, forces said liquid from said outlet into said passageway and back to said inlet when the valve is open but slows down and/or stops said part as the valve is moved from open to closed position and means independent of the pressure in the pressure chamber for pulsing the flow of liquid through said by-pass.

2. A brake as set forth in claim 1 having means to dissipate heat generated in said liquid therefrom.

3. A brake as set forth in claim 2 in which said heat dissipating means comprises fins.

4. A brake as set forth in claim 2 in which said heat dissipating means comprises a heat exchanger and thermostatic means to control flow therethrough.

5. A brake as set forth in claim 1 in which said pressure chamber has an outlet passage into said passageway and a spring biased valve closing said outlet passage to relieve pressure in said pressure chamber at a preset level, said pulsing means being operable at any pressure up to said preset level.

6. A brake as set forth in claim 1 in which said pulsing means is a solenoid having a coil in series with a current source and with a pulsing switch of controlled and variable frequency.

7. A brake as set forth in claim 6 in which said pulsing switch includes a commutator and a motor operatively connected to drive said commutator, said motor having leads connected in series with a source of current and a variable rheostat having a plurality of settings to control and vary the rotation of said commutator.

8. A brake as set forth in claim 7 in which the circuit includes safety means to prevent the commutator from maintaining the circuit for said coil in current conducting condition.

9. A brake system for an automobile having a plurality of wheels which comprises a like plurality of brakes, each brake comprising a gear pump having a casing with inlet and outlet openings and a pressure chamber, means adapted to connect each wheel to its respective gear pump, a brake housing enclosing said gear pump and providing a passageway for liquid discharged from said outlet to return to said inlet, a valve in said outlet, a by-pass connecting said pressure chamber with said inlet, a solenoid operated valve in said by-pass, a pulsating control for said solenoids, means for maintaining said housing and by-pass filled with liquid, and a common means including a brake pedal to operate each of said valves.

10. A brake system as set forth in claim 9 in which each brake includes means to dissipate heat generated in said liquid.

11. A brake system for an automobile having a plurality of wheels, a like plurality of positive displacement pumps each adapted to be connected to one of said wheels, each pump including a pressure chamber, a valved outlet from said pressure chamber, a passage from said outlet to an inlet in said pump, a common means for operating the valves in said outlets, a by-pass from each pressure chamber to the inlet of its respective pump, a solenoid operated valve in each by-pass, a common circuit for periodically actuating said solenoids simultaneously and at fairly regular intervals and manually controlled means for varying selectively said intervals.

12. A brake system as set forth in claim 11 in which said circuit includes leads from said solenoids connected in parallel and in series with a battery, and a pulsing switch of controlled and variable frequency.

13. A brake system as set forth in claim 12 in which said pulsing switch includes a commutator and a motor operatively connected to drive said commutator, said motor having leads connected in series with a battery and a variable rheostat having a plurality of settings to control and vary the speed of rotation of said commutator.

14. A brake system as set forth in claim 13 in which the circuit includes a safety means to prevent the commutator from maintaining the circuit for said coils in current conducting condition.

15. A brake system as set forth in claim 11 in which heat exchange means are provided for cooling the liquid used in said pumps.

(References on following page)

References Cited by the Examiner

UNITED STATES PATENTS

| | | | |
|---|---|---|---|
| 652,894 | 7/1900 | Herdman | 188—92 X |
| 1,631,800 | 6/1927 | Dotsch | 188—90 |
| 2,103,061 | 12/1937 | Clar | 188—92 |
| 2,106,493 | 1/1938 | Byers | 188—92 |
| 2,790,519 | 4/1957 | Crankshaw | 188—90 |
| 2,807,335 | 9/1957 | Beaumont et al. | 188—90 |
| 2,835,357 | 5/1958 | Kelly et al. | 188—264 |
| 2,899,026 | 8/1959 | Hitch et al. | 188—264 |

FOREIGN PATENTS 493,697 10/1938 Great Britain.

MILTON BUCHLER, *Primary Examiner.*

G. E. A. HALVOSA *Assistant Examiner.*